INVENTORS
JAMES E. LESTER
CHARLES H. FRANKLIN

BY *Claude A. Patalidis*

ATTORNEY

United States Patent Office 3,391,670
Patented July 9, 1968

3,391,670
AUTOMATIC HEMATOLOGICAL STAINING
APPARATUS
James E. Lester, Ypsilanti, and Charles H. Franklin, Ann
Arbor, Mich., assignors to Life Science Engineering
Inc., Ann Arbor, Mich., a corporation of Michigan
Filed June 3, 1966, Ser. No. 555,046
6 Claims. (Cl. 118—5)

ABSTRACT OF THE DISCLOSURE

An apparatus for automatically staining biological and bacteriological specimens for microscopic analysis, having a rotating member provided with arms supporting the specimens on the ends thereof for transferring the specimens to a tank containing a stain solution, for transferring the stained specimens to a wash solution, and for exposing the specimens to a forced heated air flow for a time sufficient to dry the specimens.

This invention relates to apparatus for automatically preparing microscopic specimens for analysis and more particularly to apparatus for automatically processing a plurality of such specimens through a stain developing cycle which in the case of a hematological specimen includes a dyeing step, a wash step, and a drying step.

The present invention is related to those sciences including hematology, cytology, histology, and bacteriology wherein a dye or pigment or the like is used in microscopy to render visible minute and transparent structures, to differentiate tissue elements, or to produce specific microchemical reactions. For purposes of description, the present invention will be described with reference to the preparation of hematological specimens for microscopic analysis.

Normally the specimen is formed on a slide and is treated to a dye especially selected to provide a differential effect which chromatically highlights the various constituents of the specimen. The dye most commonly employed to differentially stain blood smears consists of a compound of eosin with methylene blue and allied dyes and is termed Wright's stain. A solution of the dry Wright's stain powder in methyl alcohol is prepared and acts as an affixative and solvent when applied to a blood smear. The specimen, after being introduced to the stain, is then introduced to a buffer solution intended to develop and stabilize the pH value of the stain against changes. For purposes of description, the stain and the buffer will be considered as a single solution. Next, the specimen is introduced to a solvent, which may take the form of water. The washed specimens are then dried and, if properly prepared, the stained blood smear will have a differential appearance wherein the granules of the netrophiles will appear lilac, the granules of the osinphiles bright red, the granules of the basothils deep blue, the erythrocytes are orange or pink and the platelets are purplish blue with a distinct structure.

Normally blood smear analysis is a time consuming effort and is manually performed by a technician in the hospital laboratory. The present invention contemplates apparatus for automatically introducing a plurality of slides having blood smears thereon progressively through a staining solution, a wash solution, and then drying the slides by introducing them to a forced and heated air current. In a preferred embodiment the apparatus includes a carrier head, driven for revolution about a vertical axis, a plurality of horizontal arms fixed to the carrier and extending generally radially therefrom and with their free ends having a length sufficient to traverse a stain tank, a wash tank, and the outlet of a forced air conduit. The blood smears are normally imposed on film slides which are connected for swiveling movement to the free ends of the arms. The carrier rotates at a predetermined rate to first introduce the specimens to the solution in the dye tank for a time sufficient for the smear to be properly treated, remove the specimens from the dye tank and immerse them in the wash tank for a time sufficient to remove the excess staining solution, and then transfer the specimens to the forced air sector for a time sufficient to dry the specimens, thus completing a treatment cycle which corresponds to a revolution of the carrier head.

The present invention reduces the manual, time consuming steps in processing a plurality of specimens, thus permitting the technicians to perform less mechanical chores. Furthermore, the present invention insures a more uniform chemical preparation of hematological samples.

It is therefore an object of the present invention to reduce the time required in preparing a plurality of biological and bacteriological specimens for microscopic analysis by providing apparatus for automatically immersing the specimens for a timed interval in a stain solution, transferring the stained specimens to a wash solution wherein they are immersed for a time sufficient to remove the excess dye, and then exposing the specimens in the path of a forced and heated air current for a time sufficient to dry the specimens.

It is another object of the present invention to provide improved apparatus for preparing specimens for microscopic analysis by providing apparatus in which the specimens are immersed in a dye solution for a predetermined and uniform period of time, thus insuring a more uniform staining treatment.

Other objects, advantages and applications of the present invention will become apparent to one skilled in the art to which the invention pertains upon reference to the following detailed description of a preferred embodiment of the invention and to the accompanying drawings in which like reference characters refer to like parts throughout the several views and in which.

Figure 2:
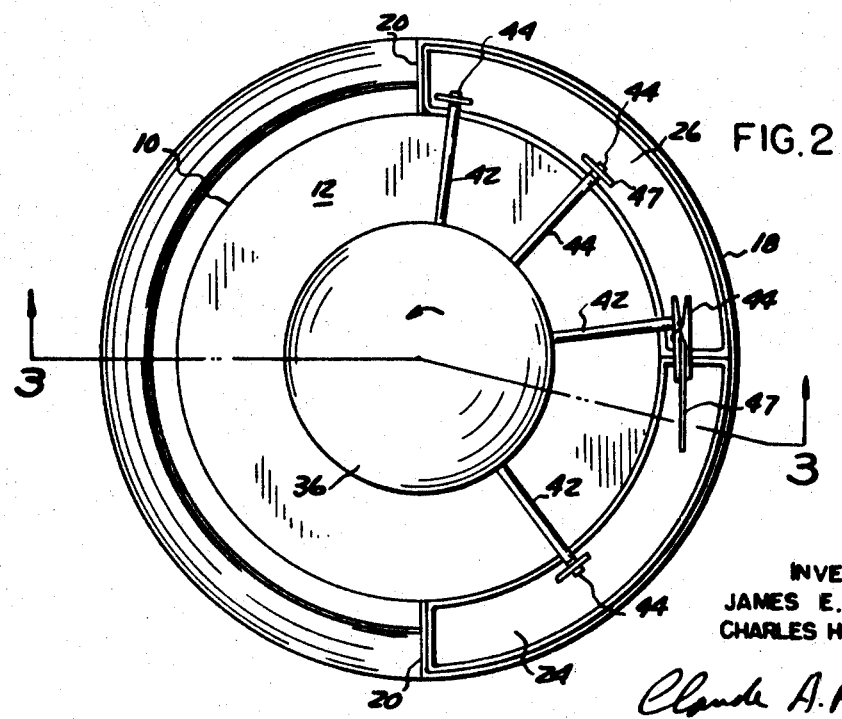
FIG. 2 is a plan view of the staining apparatus illustrated in FIG. 1.
Figure 3:
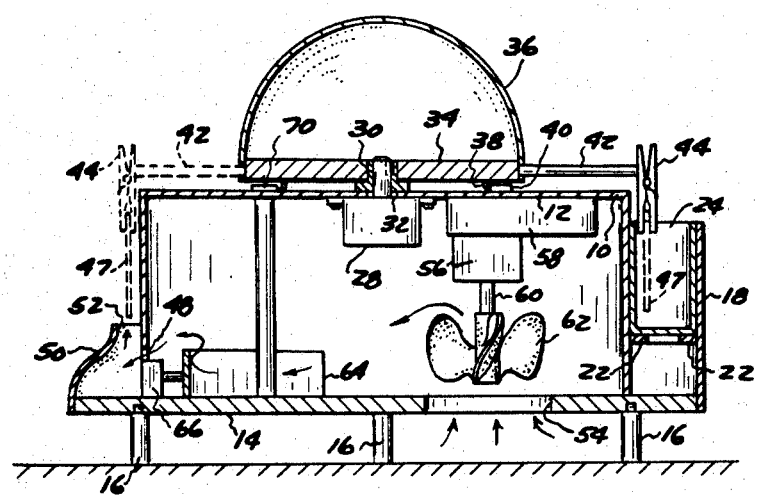
FIG. 3 is a sectional view substantially as seen from the line 3—3 of FIG. 2 with parts shown schematically for purposes of clarity.

Referring to the drawings, FIG. 3 illustrates a preferred staining apparatus as comprising a cylindrical housing generally indicated at 10 having a closed upper end 12 and seated on a base plate 14. The base plate is provided with a plurality of short supporting legs 16 on the under surface thereof which space the base plate 14 from a supporting surface. The parametrical edge of the base plate extends outwardly from the housing 10 and is provided on a semicircular sector with an upright support member 18 which is spaced from and parallel to the circumferential surface of the housing 10. End plates 20 provide supporting stability to the support member 18 and connect opposite ends thereof with the housing 10. As can best be seen in FIGS. 2–3, a pair of lip members 22 are provided on the outer surface of the housing 10 and the inner surface of the support member 18 at a similar distance from base plate 14. A pair of open topped, arcuate containers or tanks indicated at 24 and 26 are seated on the lips 22 and have a height such that they extend preferably just below the upper end 12 of the housing 10.

The first tank 24 contains a suitable solution for staining hematological specimens and is therefor formed preferably of a non-corrective plastic material. The second tank 26 has a similar configuration to the first tank 24 and contains an agent such as water for washing the excess dye from the specimens.

Referring back to FIG. 3, a geared-down electric motor 28 is mounted on the interior of the housing 10 and has an output shaft 30 extending through an aperture 32 which is formed on the longitudinal axis of the housing 10. The upper end of the output shaft 30 supports for rotation a generally flat circular carrier member 34. The carrier member 34 is provided with a cover member 36. The carrier is spaced from the upper end 12 of the housing 10 and carries a depending pin 38 which is adapted to operatively engage a micro-switch 40 mounted to the upper surface of the housing 10.

Figure 1:
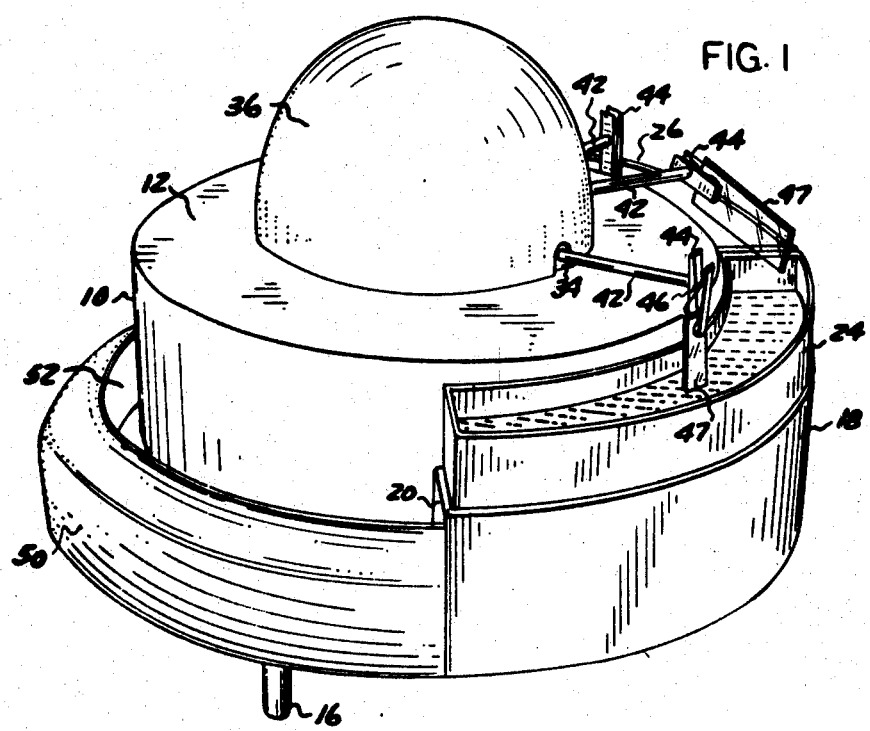
FIG. 1 is a perspective view of an automatic hematological staining apparatus embodying the present invention.

Referring to FIGS. 1–3, the carrier member 34 carries a plurality of radially extending horizontal arms 42. As can best be seen in FIG. 3, the arms 42 extend radially from a common axis off-set from the axis of rotation of the carrier member 34. The free ends of each of the arms 42 terminates at a point over and above the open top of the tanks 24 and 26. A spring-loaded specimen holding clip 44 is fixed to the outer end of each of the arms 42 by a pin 46 which permits the clip to swivel about a line forming an extension of the axis of the arm 42. A slide 47 with a blood smear specimen is clamped in each clip 44 and hangs downwardly therefrom to a point below the upper edge of the tanks 24 and 26.

The lower edge of the housing 10 on the side opposite the tanks 24 and 26 is raised from the base plate 14 to provide a semi-circular aperture 48. A baffle 50 is fixed to the perimeter of the base plate 14 and extends from one of the end plates 20 around the base plate on the side opposite the tanks 24 and 26 to the other end plate 20. The baffle 50 is bent inwardly toward the housing and then upwardly to define an outlet duct 52 immediately below the normal orbit of the clips 44.

Still referring to FIG. 3, the base plate 14 has defined therein on the side opposite the duct 52 a circular inlet port 54. A motor 56 is supportably mounted to the interior of the housing 10 by a bracket 58 and has an output shaft 60 carrying a fan 62 which is axially aligned with the port 54 to induct air therethrough. Preferably the fan 62 has a capacity of about 100 cubic feet per minute.

A second baffle 64 is fixed to the base plate 14 and spaced radially inwardly from the lower edge of the housing 10 defining the aperture 48. The fan 62 is operable to draw air through the port 54 into the housing 10 where it is delivered to the aperture 48 where it passes in heat transfer relationship and slightly pressurized through heater 66. The heated air is then discharged through the duct opening 52 to pass in moisture removing relationship with slides 47 traversing the discharge opening of the duct 52.

Figure 4:
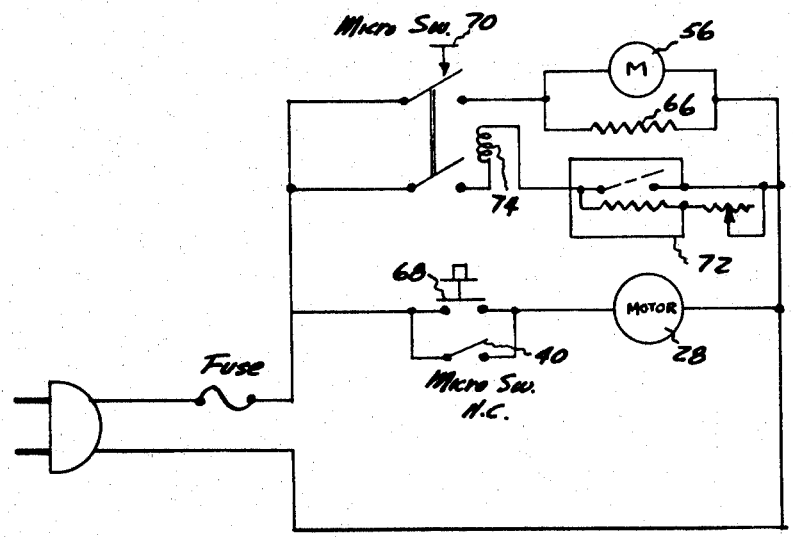
FIG. 4 is a schematic illustration of a preferred timing control circuit for the present invention.

In operation, the preferred staining apparatus prepares a slide specimen in a single revolution of the carrier 34. The slides 47 are clamped in the clips 44 which are initially disposed over the inactive duct 52. Referring to FIG. 4, the cycle is initiated by the operator pressing a push button switch 68 to close an energizing circuit for the motor 28. The pin 38 carried by the carrier plate 34 is normally operatively engaged with the switch 40 so that the switch is opened when the carrier is in its terminal position. When the push button switch 38 is closed, motor 28 is energized to slowly rotate the carrier member 34 sufficiently so that pin 38 disengages the switch 40 permitting it to close and complete the energizing circuit to the motor 28. The push button switch 68 is then released to return to its normally open position. It is to be understood that when the carrier member 34 has made one complete revolution, the pin 38 moves into engagement with the switch 40 to open the energizing circuit thus deenergizing the motor 28.

Still referring to FIGS. 3–4, the pin 38, after the motor 28 has been energized, moves into engagement with a second microswitch 70 which is operatively engaged to close an energizing circuit including the fan motor 56, the heater 66 and a timer 72.

With reference to FIG. 1, the staining apparatus rotates the specimens in a counterclockwise direction. Each of the slides 47 is initially immersed in the tank 24 which contains a suitable dye solution. The motor 28 continues to rotate the carrier member 34 so that the slides 47 pass through the length of the tank 24, swivel about the arms 42 to ride up over the far edge of the tank and then swing down into the second tank 26. With reference to FIG. 3, the common axis of the arms 42 is offset to preclude the possibility of the slides becoming tangled with one another as they move out of one tank and into the next. It can be seen that the trailing edge of the tank 24 also functions as a wiper to assist in removing the excess dye solution from the slides. It may be desirable when using or processing large or irregularly shaped slides to provide a wiping element at the trailing edge of the tank 24 which may take the form of a member having suitable absorption properties.

It is to be understood that the carrier 34 rotates at a speed suitable to maintain the slides immersed in the dye for a time sufficient for a blood smear, for example, to become properly developed. The specimen is then immersed in the second tank 26 which has a length sufficient to permit the excess dye to be removed from the slides. When the first arm 42 has traversed the second tank, 26, the pin 38 engages the microswitch 70, FIG. 3, to energize the fan motor 56 and the heater 66 to discharge a heated current of air from the duct 52 to dry the treated slides. At the same time, thermal timer 72, FIG. 4, which is set for a time sufficient to permit the heated air to dry the specimens, establishes a circuit through relay coil 74 of microswitch 70 holding the switch closed for a period of time for which the thermal timer is set. When the specimens are dry, they are easily and quickly removed for microscopic analysis.

It is to be understood that we have described in detail a new and improved apparatus for automatically staining, washing and drying bacteriological and biological specimens for the purpose of microscopic analysis. It can therefore be seen that the improved apparatus will process a plurality of specimens with a minimum of handling by the operator and with a uniform and consistent treatment by the dyeing or staining agents.

It is to be further understood that a dual tank system has been illustrated only for purposes of description. A single tank partitioned into a plurality of open topped compartments could be used depending on the number of treating agents required for preparation of the specimens. Furthermore the tanks can be dissimilar in size providing the length of each tank is sufficient to permit the specimen to be immersed in the solution contained therein for a suitable treating period.

Although we have described but one preferred embodiment of the invention, it will be apparent to one skilled in the art to which the invention pertains that various changes and modifications may be made therein without departing from the spirit of the invention as expressed in the scope of the appended claims.

We claim:

1. An automatic processing apparatus for progressively introducing a plurality of biological specimens and the like to a plurality of treating solutions and then to a drying station for microscopic analysis or the like, said apparatus comprising:

(a) a housing;

(b) a plurality of open topped containers supported by said housing and arranged about a common vertical axis and each of said containers suitable for holding a treating solution;

(c) a carrier member supported for rotation about said common axis;

(d) article holding means associated with said carrier member and disposed for progressive movement over each of said containers, said article holding means being operable for motion in cooperation with the rotation of said carrier member to immerse an article containing a biological specimen in the solution disposed in each of said containers simultaneously with the movement of said article holding means over said containers and for a time sufficient for said solution to process said article;

(e) each of said article holding means being movably connected to the free end of an arm extending from said carrier member and said arms being operable to carry said article holding means in a regular path over the upper open edge of each of said containers;

(f) each of said article holding means including a clamp pinned to the free end of each of said arms for swiveling movement in a plane normal to the axis of said arm, the free end of each of said arms being spaced from the upper edges of said containers a distance sufficient to permit the clamp to swivel when the article encounters an extreme edge of said containers thereby permitting progressive transfer of said article into and out of said containers; and (g) means for introducing a fluid in moisture absorbent relationship to said article subsequent to the solution immersion of said article and effective to dry said article for microscopic analysis or the like.

2. The invention as defined in claim 1, including drive means operable to rotate said carrier member at a regular rate and wherein each of said solution holding containers has a length corresponding to the path of movement of said article holding means and proportional to the required treating time.

3. The invention as defined in claim 1, wherein said housing defines a chamber having an inlet and an outlet, means for inducting air through said inlet, pressurizing said air and discharging said pressurized air through said outlet, and said outlet including a discharge duct for delivering said pressurized air to said treated articles for a time sufficient to dry said articles.

4. The invention as defined in claim 3, including a heating device disposed in said housing and operative to heat said pressurized air to a predetermined level.

5. The invention as defined in claim 3, wherein said pressurizing means comprises a fan associated with said inlet, and means for driving said fan.

6. The invention as defined in claim 5, including control means for energizing said air pressurizing means in timed relationship to the rotation of said carrier member.

References Cited

UNITED STATES PATENTS

| | | | |
|---|---|---|---|
| 2,209,006 | 7/1940 | Smith | 118—426 X |
| 3,302,607 | 2/1967 | Kobernick | 118—425 X |

CHARLES A. WILLMUTH, *Primary Examiner.*

JOHN P. McINTOSH, *Examiner.*